June 17, 1958  O. GREBE  2,838,912

FLUID DRIVE OF FOETTINGER TYPE

Filed May 23, 1955

United States Patent Office 2,838,912
Patented June 17, 1958

2,838,912

FLUID DRIVE OF FOETTINGER TYPE

Otto Grebe, Olpe, Germany, assignor to Elektro Mechanik G. m. b. H., Olpe, Westphalia, Germany Application May 23, 1955, Serial No. 510,335

Public Law 619, August 23, 1954
Patent expires August 23, 1974

2 Claims. (Cl. 60—54)

This invention relates to fluid drives and more particularly to fluid drives of the so-called Föttinger type in which a pump element sets in motion a fluid which, in turn, drives a turbine element.

It is customary to rotate the pump element at a constant speed to drive the turbine element at a speed which may vary from zero up to a maximum of somewhat less than the speed of the pump element. The torque-speed curve of such fluid drives is in the form of a parabola with a maximum efficiency of some 80 to 85%, and the practice has been to design the blades to keep turbulence within the fluid circuit at a minimum at a preselected mean turbine speed since the efficiency drops off rapidly at each side of the maximum efficiency speed of the driven turbine element.

It has been proposed to avoid this drop in efficiency by constructing the turbine with blades of adjustable pitch and, while this afforded some increase in efficiency, relatively complex constructions were required in view of the numerous turbine blades. Another proposed expedient was to employ change-speed gears with a Föttinger transformer, thereby obtaining the desired final speed while operating the Föttinger transformer in only its efficient range of speed transformation. Such arrangements have been employed in vehicle transmissions but require numerous additional parts to cover a wide range of speeds.

Objects of the present invention are to provide fluid drives which operate at high efficiency over a wide range of output speeds. Objects are to provide fluid drives in which turbulence and cavitation are eliminated over a wide speed range. More specifically, an object is to provide a fluid drive employing a magnetizable fluent material, i. e. powdered iron or powdered iron suspended in oil, and a magnetic field for preventing turbulence of the fluent material.

Figure 1:
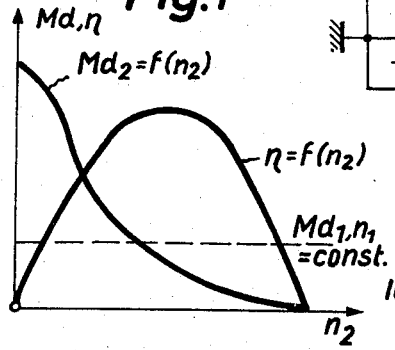
Figure 2:
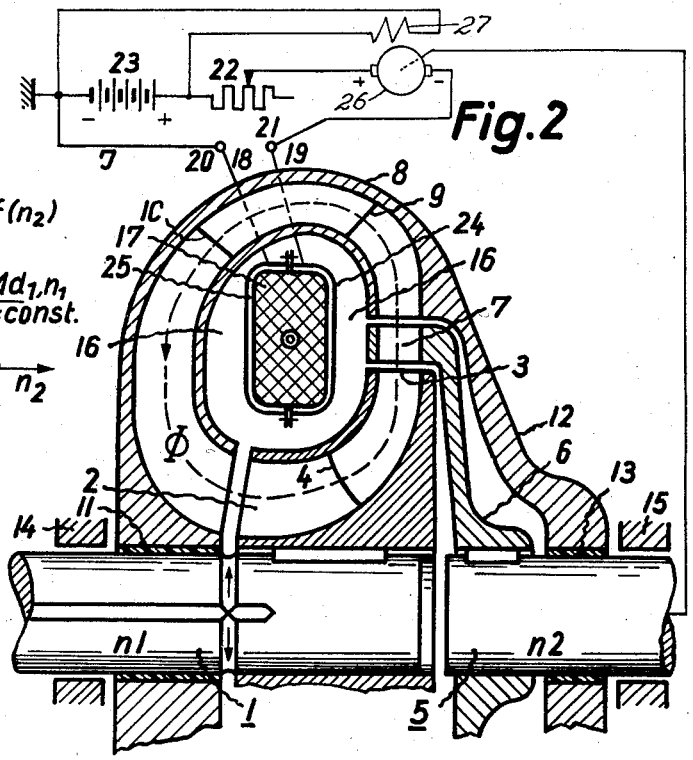
Figure 3:
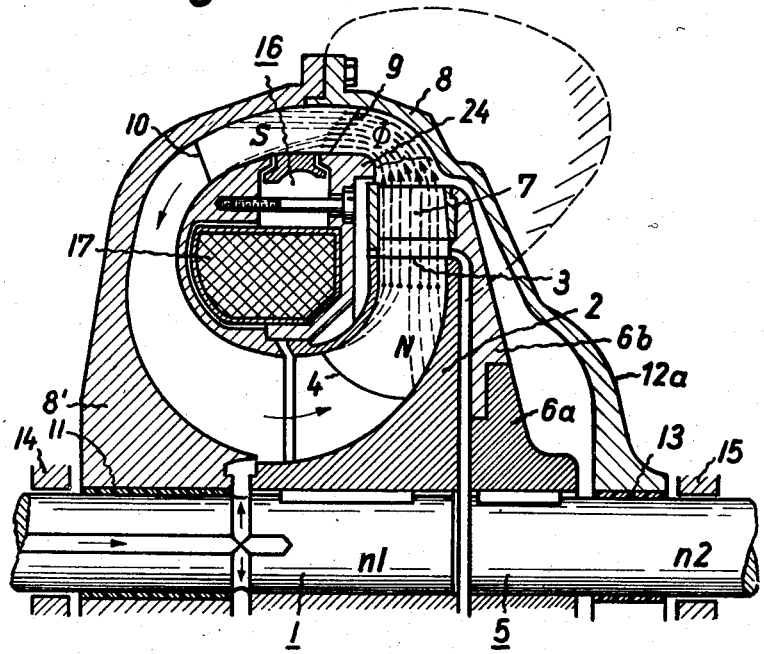

These and other objects and the advantages of the invention will be apparent from the following specification when taken with the accompanying drawings in which:

Fig. 1 is a chart showing the characteristic curves of the known fluid drives; and Figs. 2 and 3 are fragmentary longitudinal sections of fluid drives embodying the invention.

The magnetizable fluent material employed in the illustrated embodiments of the invention comprises a mixture of oil, and preferably a silicone oil having a low solidifying point, and powdered iron having a mean diameter of only a few microns. By choice in the process of manufacture of, for example carbonyl iron, the particles may have the property of permanent magnetism or may be capable of residual magnetization only to a negligible extent. Iron globules of a diameter of 8 microns in an oil of a kinematic viscosity of 2 centistokes, equal to about 1.1° Engler viscosity, provide an appropriate fluent material, the iron being present in the maximum ratio, by weight to the oil, of 10:1. Iron particles of this size remain substantially in suspension in the oil and impart a magnetic permeability of about 8 to the fluent mixture, i. e. a permeability about eight times that of air. The specific gravity of the specified 10:1 mixture is 4.5 as compared to 0.8 for oil alone, and even when equal weights of oil and iron are employed, the specific gravity is 1.5. Since the pressure developed by the pump element is proportional to the centrifugal force, the increase in specific gravity results in a considerable increase in the output of the fluid drive. For a given installation to deliver a specified output, the speed of the pump may be materially reduced through use of the invention or, if the pump speed be kept constant, the output can be increased considerably.

In Fig. 2 of the drawings, the reference numeral 1 identifies a drive shaft carrying the pump 2 of a Föttinger torque transformer and rotating the same at a constant speed $n1$. The blades of the pump have upper edges 3 and lower edges 4. A shaft 5 carries the turbine 6 which has blades 7 with entrance edges closely adjacent the exit edges 3 of the pump blades. A reaction member 8 with blades having entrance edges 9 and exit edges 10 completes the toroidal fluid circuit of the transformer. A packing 11 is provided between the reaction member 8 and shaft 1, and that portion 12 of the reaction member which encloses the pump 2 and turbine 6 has a packing 13 between it and the driven shaft 5. Bearings 14 and 15 support shafts 1 and 5 respectively and, if desired, when the reaction member 8 is to run idle when the transformer is up to speed, a known form of coupling, not shown, may be provided for the direct connection of drive shaft 1 and driven shaft 5. For the present, however, it may be assumed that the reaction member 8 remains stationary.

In the annular space 16 within the transformer, an annular coil 17 is arranged and supported on the reaction member 8 by arms, not shown. The end wires 18, 19 of the coil extend to the exterior of the reaction member through one of the blades and are connected to terminals 20, 21. If the reaction member is to rotate, one wire is grounded on the reaction member and the other is connected to a contact ring which is insulated from and mounted on the hub of reaction member 8 adjacent the bearing 14. In this case, one terminal, for example terminal 20, is also grounded on the reaction member and terminal 21 is connected to a brush bearing upon the insulated contact ring. The terminals 20, 21 are connected, preferably through an adjustable resistance 22, across a current source 23 which may be, in the case of a fluid drive for a vehicle, the customary storage battery of the car. The coil 17 is enclosed in a casing comprising two annular parts 24, 25 of non-magnetic material which are secured to each other in any desired manner to seal off the coil 17 from the oil-iron mixture which enters the space 16 as well as the fluid circuit of the transformer.

In use of the fluid drive, if the coil 17 is connected to the current source 23 over resistance 22 so that current flows as indicated by the symbol of a dot within a circle, i. e. out of the paper as one views the drawing, closed flux lines $\phi$ will be set up around the coil, the direction of the flux lines being counterclockwise as indicated by the arrow, thus coinciding with the direction of the fluid current. Any tendency toward turbulence would be accompanied by a movement of the iron particles transversely of the fluid stream but this is prevented by the magnetic field. Only a relatively light magnetizing current is required since turbulence builds up from a transverse movement of the fluid stream, and this is blocked at its inception by the magnetic restraint which insures a lamellar arrangement of the iron particles and therefore of the complete fluid stream. The particles remain suspended in the oil and do not settle out or accumulate at any part of the circuit and they do not score the blades or add appreciably to the frictional resistance to flow. Cavitation is prevented and, as a matter of fact, a torque converter may be operated when less than completely filled, in the same manner as a Föttinger coupling.

The tendency toward turbulence is a maximum at starting up when the speed $n2$ of driven shaft 5 is zero and maximum magnetization is then desirable. When the torque converter is operating at maximum efficiency, the magnetizing current may be completely interrupted. The resistor 22 may be adjusted automatically in accordance with the driven shaft speed, for example by a centrifugal governor or an eddy current control to reduce or interrupt the magnetizing current. Another form of automatic control, shown in Fig. 2 is a direct current generator, the armature 26 of which is driven by shaft 5 and connected to coil 17 in opposition to the battery 23, the generator field winding 27 being energized by connection to the terminals of battery 23, and the generator armature 26 developing a voltage which balances that of the battery when shaft 5 is operating at, for example, about one-half its maximum speed. With this arrangement, the magnetization will be automatically reduced to about zero at the selected speed for shaft 5.

The pump and reaction member elements will usually be constructed of non-magnetic material but it is possible to line those portions of the same in which there is a minimum tendency toward turbulence with magnetic material, thereby reducing the reluctance of the magnetic circuit and permitting a reduction in the energizing current.

It is also possible to employ iron or other magnetic material for the major portions of the torque converter. The torque converter shown in Fig. 3 is of the same general construction as the Fig. 1 apparatus but the pump 2, the base 6a of the turbine, and the portion 8' of the reaction member which constitutes the major portion of the return circuit for the fluid are of iron, as indicated by the fine cross-hatching. The portion 6b of the turbine which carries the blades 7 and the portion 12a of the reaction member which encloses the pump and turbine are of non-magnetic material, as indicated by the more open cross-hatching. The iron portion 8' of the reaction member is relatively thick to provide a path of low reluctance for the magnetic flux. With this arrangement, the exit ends 3 of the pump blades and the entrance ends 9 of the reaction member blades constitute poles between which the magnetized fluent material passes in lamellar flow which prevents turbulence.

A magnetic induction of up to 10,000 gauss, that is 10,000 flux lines per square centimeter can be obtained with a relatively low number of ampere turns at coil 17 and, at this magnetization, there is substantially no slippage of the magnetic fluid at the blades and the entire assembly operates with a free reaction member substantially as an oil-magnetic clutch. It is thus possible to eliminate the mechanical coupling which has been provided between the driving and driven shafts in some of the fluid drives previously employed as vehicle transmissions.

It is also possible to operate in accordance with the invention without providing a magnetizing coil within the fluid drive apparatus when the iron powder of the operating fluid is of the type having a high residual magnetism, i. e. is of the type employed in the film tape of magnetic recorders. In this case the operating fluid need be magnetized only once, and this may be done outside of the fluid drive apparatus. When high field strength is required, however, to prevent low pressure regions in the fluid circuit, the magnetizing coil will be required for occasional or continuous use even though the iron powder retains some magnetization. In place of an oil-iron powder mixture it is possible to employ a fluent mass of iron powder, the individual particles of the powder being preferably of spherical form of the order of magnitude of about 3 microns. To protect the powder against oxidation, it is advisable to moisten the mass with an oxidation-preventing fluid.

I claim:

1. A hydro-dynamic torque converter comprising a rotary bladed pump member, a rotary bladed turbine member and a stationary bladed reaction member arranged so as to establish a toroidal fluid circuit, the fluid in said circuit being a mixture of oil and magnetizable particles, the blades on said members and the portions of said members themselves in the vicinity of the blades where turbulence is most likely to occur being made of non-magnetizable material, a coil disposed within the central space defined by said toroidal fluid circuit, and a D. C. current source for energizing said coil to magnetize said particles and to set up in said fluid circuit a closed path of magnetic lines of force extending around said coil, said lines of force passing through said magnetized fluid mixture within the vicinity of said non-magnetic blades and non-magnetic portions of said pump, turbine and reaction members and serving to prevent any movement of the magnetized particles in said fluid mixture transversely out of said fluid stream thereby preventing turbulence in said mixture.

2. A hydro-dynamic torque converter as defined in claim 1 wherein said current source for energizing said coil comprises a constant D. C. voltage arranged in series opposition with the output voltage of a D. C. generator, the armature of said generator being driven by said turbine member to produce a D. C. output voltage variable with the speed of said turbine member and said D. C. output voltage being substantially equal to said constant D. C. voltage at the speed at which said torque converter operates with its best efficiency.

References Cited in the file of this patent
UNITED STATES PATENTS

| | | |
|---|---|---|
| 2,643,748 | White | June 30, 1953 |
| 2,718,157 | Schaub | Sept. 20, 1955 |

FOREIGN PATENTS

| | | |
|---|---|---|
| 812,142 | Germany | Aug. 27, 1951 |